June 1, 1937.  E. E. DOUGHERTY  2,082,101

PROCESS OF TREATING A MIXTURE OF CALCIUM AND MAGNESIUM HYDROXIDES

Filed Dec. 31, 1931  3 Sheets-Sheet 1

Patented June 1, 1937

2,082,101

UNITED STATES PATENT OFFICE 2,082,101

PROCESS OF TREATING A MIXTURE OF CALCIUM AND MAGNESIUM HYDROXIDES

Elmer E. Dougherty, Glen Ridge, N. J., assignor of one-half to N. I. Stone, New York, N. Y.

Application December 31, 1931, Serial No. 584,299

6 Claims. (Cl. 23—91)

This invention relates to a process for effecting the separation and recovery of certain metals, alkaline earth metals and metallic compounds from raw materials containing the same, either mixed or chemically combined with other substances.

In carrying out the process the raw material is treated to produce the material or materials to be recovered in the form of the hydroxide of the base or bases and then reacting to form an insoluble compound of one of the same which can be separated out.

The process herein described as illustrative of this invention is particularly directed to effecting a substantially complete chemical and, finally, physical separation of calcium and magnesium in compounds containing them, such, for example, as dolomite.

An important object of the invention is to effect not only substantially complete decomposition of material or compounds containing magnesium and calcium, but also the recovery of the principal constituents, i. e. magnesium oxide and calcium oxide.

Other features and advantages will appear upon consideration of the following description.

Figure 1:
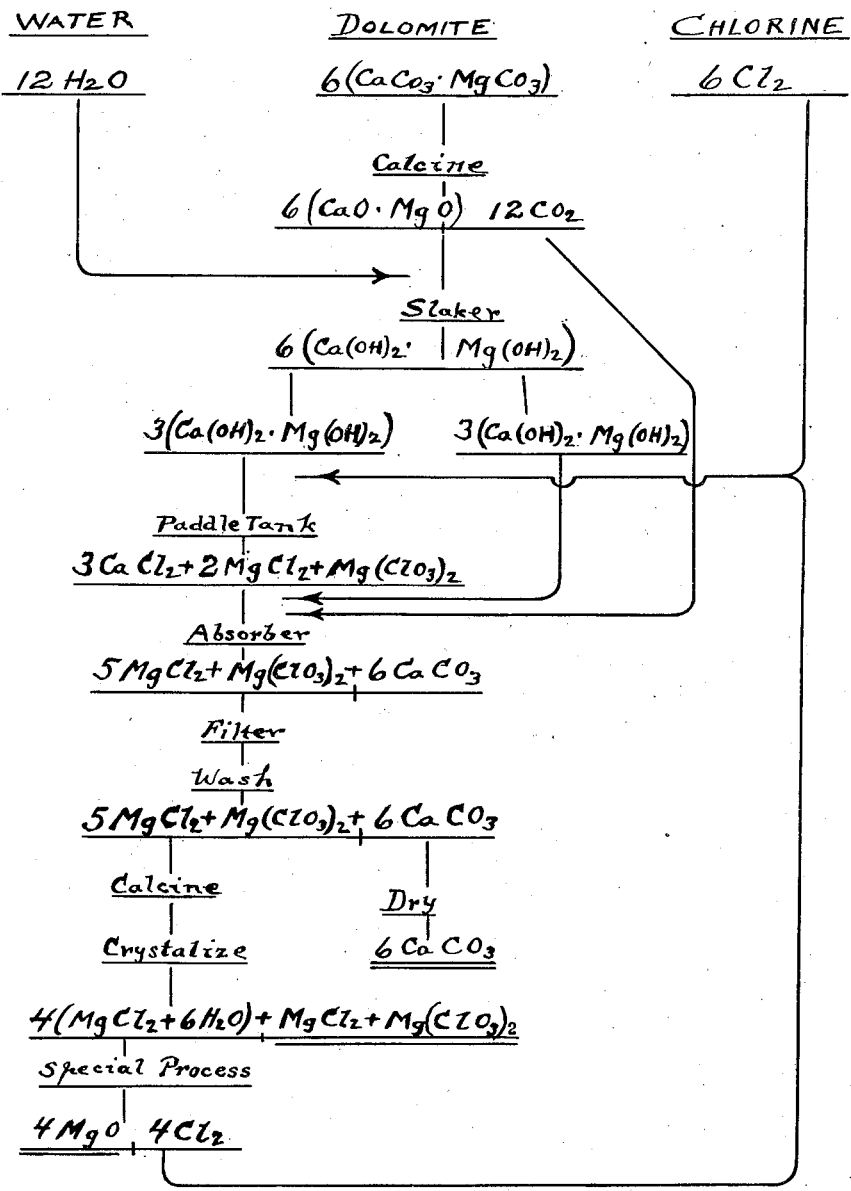
Figure 2:
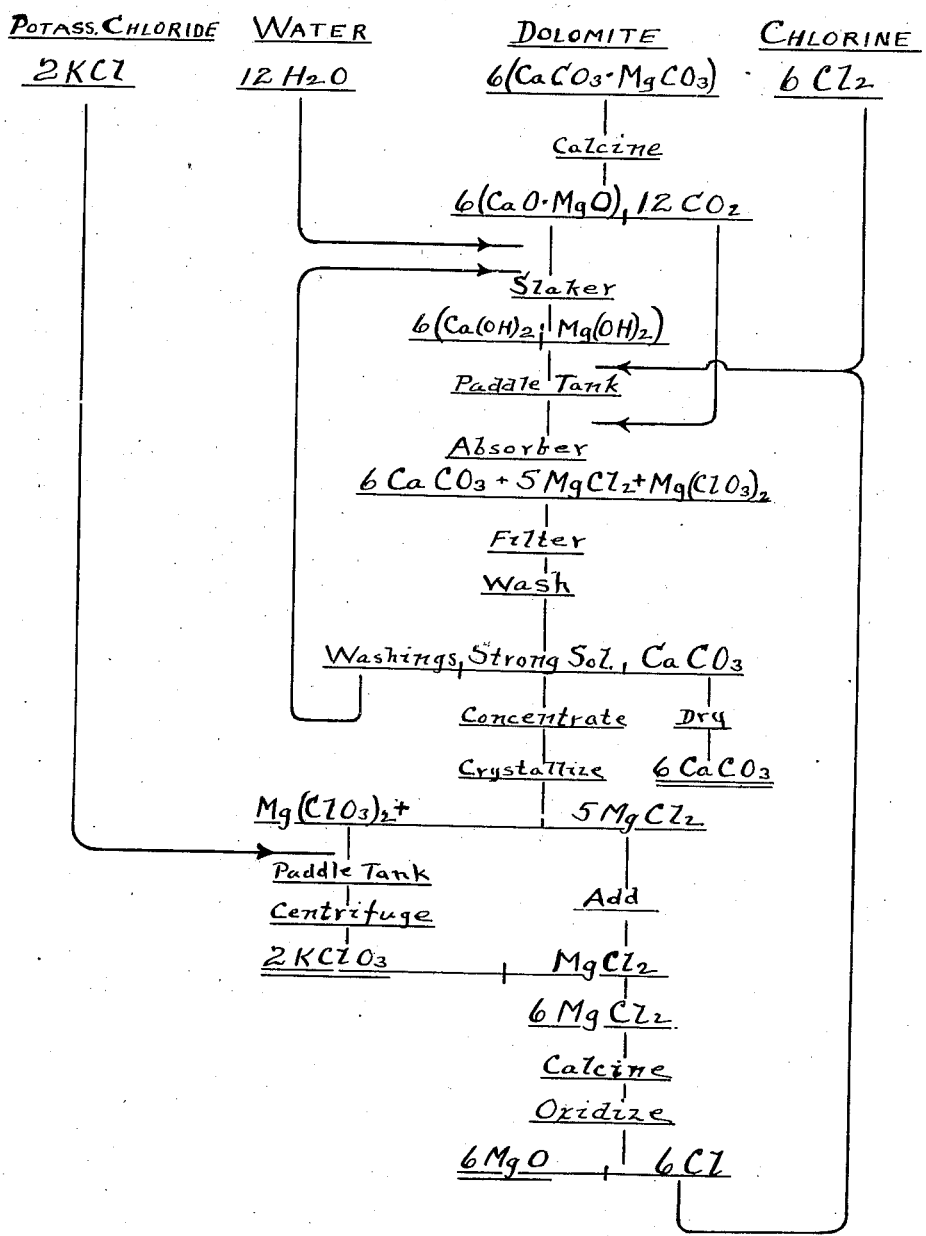
Figure 3:
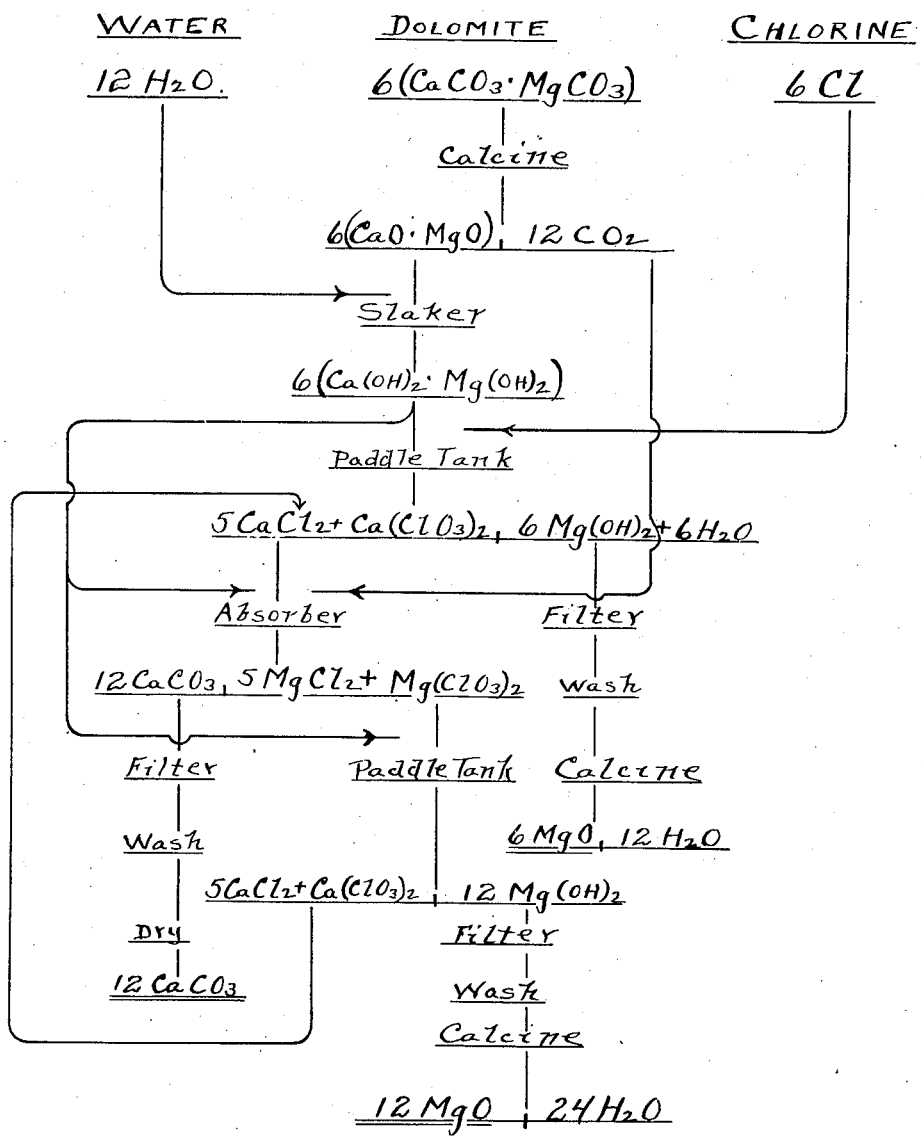

In the drawings, flow sheets are given illustrating the process. Fig. 1 is a general flow sheet of the process; Fig. 2 is a flow sheet illustrating the modifications represented in steps 6, 7 and 8; Fig. 3 is a flow sheet illustrating the modified process described in steps 6 and 8 of the specification.

For illustrative purposes, the process will be described as applied to dolomite, which has the following theoretical composition:

| | Percent |
|---|---|
| Magnesium carbonate, $MgCO_3$ | 45.73 |
| Calcium carbonate, $CaCO_3$ | 54.27 |
| Total | 100.00 | or a better idea of the ratio of bases to the acid radical, wherein calcium oxide and magnesium oxide constitute the bases and carbon dioxide constitutes the acid radical:

| | Percent |
|---|---|
| Magnesium oxide, $MgO$ | 21.86 |
| Calcium oxide, $CaO$ | 30.40 |
| Carbon dioxide, $CO_2$ | 47.74 |
| Total | 100.00 |

Silica, alumina, iron and other impurities are usually present in various proportions in the natural dolomite rock.

Although the above analyses are based on the theoretical composition of pure dolomite, with the calcium oxide and magnesium oxide present in exact molecular proportions and free from impurities, as a matter of fact, the dolomite mineral which is available in large quantities has a varying ratio of calcium oxide to magnesium oxide, the calcium oxide, as a rule, predominating and, in addition, contains various impurities as is shown in the following analyses of typical minerals:

Connecticut

| | Percent |
|---|---|
| $CaO$ | 32.09 |
| $MgO$ | 18.92 |
| $CO_2$ | 46.76 |
| $SiO_2$ | 1.12 |
| $Al_2O_3 + Fe_2O_3$ | 0.32 |
| Total | 99.21 | or the following two samples from Shenandoah region of Virginia, which show a more complete analysis:

Shenandoah dolomite

| | I | II |
|---|---|---|
| | Percent | Percent |
| Insoluble residue | 2.90 | 0.20 |
| $SiO_2$ | Trace | Trace |
| $TiO_2$ | None | None |
| $Al_2O_3$ | 0.43 | 0.37 |
| $Fe_2O_3$ | 0.94 | 0.22 |
| $MnO$ | None | Trace |
| $BaO$ | None | None |
| $K_2O$ | 0.24 | 0.12 |
| $Na_2O$ | 0.21 | 0.10 |
| $H_2O$ | 3.30 | 3.92 |
| $P_2O_5$ | None | None |
| $SO_3$ | None | None |
| $CaO$ | 30.06 | 30.71 |
| $MgO$ | 18.41 | 21.56 |
| $CO_2$ | 43.98 | 43.88 |
| Total | 100.47 | 101.08 |

Although dolomite is given as an example, this process may be applied just as readily to dolomitic limestone, or magnesium and calcium bearing compounds constituting residues and wastes formed in great quantities in certain industries.

Calcium is objectionable in magnesia products, and magnesia is just as objectionable in calcium products. Therefore, a valuable phase of this process is the ease with which one base is separated from the other, resulting in products relatively free from each other as contaminants.

Magnesia free calcium minerals and calcium free magnesium minerals are not very plentiful nor widely distributed, but in the metallurgical, chemical, cement, or pharmaceutical industries, the importance and desirability of pure magnesia and calcium products is recognized.

Dolomite is widely distributed in relatively large quantities, is cheap, and there is a comparatively small demand for it, as such, but when subjected to this process it may be used as a source of various valuable products for which there is considerable demand. Although calcium carbonate and calcium chloride, and magnesium chloride, hydroxide, carbonate and oxide are mentioned specifically as the products of this process, it may readily be seen that, having first obtained these products, any desired salt or compound may be made at will.

In addition to the valuable points emphasized above, the process is simple and direct, is capable of economical operation, and is unique insofar as dependence is placed primarily on the various reactions possible, and compounds that may be formed in the presence of a foreign reagent, by the constituents already in the raw material. Thus there is brought about an economical method, inasmuch as dependence is placed primarily on the reactions between, or recombinations of the constituents found in the original mineral or material, in the presence of a foreign reagent, and the production of compounds of the two bases involved, as water soluble and water insoluble products, which may be completely separated from each other by filtration and washing.

Dolomite, being probably the most common, most widely distributed in large quantities, and at the same time most cheaply procured combination of calcium and magnesium carbonates, is taken as an example of the material to be treated. It will be obvious, however, from the description of the process, that limestone with low magnesia contents and magnesia with low calcium contents, magnesite, serpentine and other minerals of like character, or even industrial wastes containing calcium and magnesium oxides in sufficient quantity, may be treated just as readily. Therefore, it is to be understood that I do not limit the application of the process to dolomite only.

In carrying out my invention, various modifications are possible without deviating essentially from the principles and scope of the process, but I have found that the following method of procedure will give substantially perfect results.

I have found that, due to the presence of an acid radical that is capable of forming water soluble salts with both the magnesium and calcium, taking advantage of the selective action of the same reagent, and also of the acid radical, carbon dioxide, already present in the mineral or raw material (which had been driven off during the initial decomposition of the mineral and recovered by suitable means) a substantially perfect re-combination of the calcium and carbon dioxide is brought about in the cold, with the resultant production of water insoluble calcium carbonate, in the presence of a water soluble salt of magnesium. In order to effect the complete separation of the bases calcium and magnesium, it is necessary not only that they be present in perfect molecular ratio, but there should be also enough of the acid radical present to combine with the magnesia completely, thereby forming a neutral, water soluble salt of the magnesia content. Due to this same selective action of the correct amount of acid radical, in the presence of a molecular ratio of calcium to magnesium, an intermediate series of water soluble and water insoluble compounds of the calcium and magnesium are formed alternately, such reactions being an essential part of the process.

The calcium, preferably, is removed from the cycle of reactions as the water insoluble carbonate, in the presence of a water soluble salt of magnesium, and the magnesium is, in turn, removed from the cycle of reaction as the water insoluble hydroxide in the presence of a water soluble salt of calcium. Filtration and washing are resorted to in completely separating the water insoluble from the water soluble compounds. Where the water insoluble compound consists of calcium carbonate, the water soluble compound would be a magnesium salt, and where the water insoluble compound consists of magnesium hydroxide, the water soluble compound would consist of a calcium salt. The reason for this is quite apparent, when it is considered that there is sufficient acid radical in the cycle to take care of only one of the bases; therefore the other one must of necessity exist as a hydroxide, which combination is made possible by the presence of the water in the solution. Carbon dioxide, being a stronger acid radical than the hydroxyl group, will displace it and form a carbonate instead of a hydroxide, when introduced into the mixture. As calcium is basically more active than the magnesium, it will combine with the carbon dioxide in preference to the magnesium and will take up no more carbon dioxide than the calcium requires, due to the presence of the other acid radical (capable of forming water soluble salts with either of the bases) and which necessarily must combine with the other base, magnesium. In the absence of this extra acid radical carbon dioxide, and in the presence of just enough of the acid radical (capable of forming water soluble salts with either bases) to combine with one base, it will invariably select the stronger base calcium, leading, incidentally, to the formation of magnesium hydroxide, which combination is made possible by the presence of water.

Any acid radical, capable of forming water soluble salts with not only the magnesium, but the calcium also, may be used in this process. It may be introduced as an acid, or in combination with either calcium or magnesium. Inasmuch as hydrochloric acid or a chloride is possibly the cheapest and most easily obtained in large quantities, and at the same time the best known acid radical of this type, and more especially as this process is designed to utilize a chlorine radical, it will be used as an example.

Sodium chloride is the most plentiful and cheapest source of hydrochloric acid or chlorine known. It is a well known fact that sodium chloride when subjected to electrolysis is decomposed, with the formation of sodium hydroxide, hydrogen and chlorine, and these products are separated and transformed into marketable products. Immense quantities of sodium hydroxide, or caustic soda, and chlorine are produced at the present time, and in this manner; at a number of electrochemical plants, using a variety of electrolytic cells.

As the production of sodium hydroxide from this source increases it is readily absorbed by the market, and there is every reason to believe that the demand for sodium hydroxide will continue to increase as in the past. The demand for hydrogen is constantly increasing, due partly to new processes, and the greater amounts being consumed in some of the older processes. Although a great deal of chlorine is used, as such, and marketed as liquid chlorine in cylinders, etc., and as chlorinated organic chemicals, bleaching powders, etc., there is every reason to believe that the production of electrolytic caustic soda is restricted to a great extent by the possible uses and market for the large quantities of chlorine, incidentally produced as a by-product. If this is so, then an assured outlet for the large quantities of chlorine produced per unit of caustic soda (or about 89 lbs. of chlorine for each 100 lbs. of caustic soda) would, obviously, encourage the installation of additional and larger electrolytic caustic soda plants.

This invention is designed primarily as a new and adequate outlet for very large quantities of by-product chlorine, especially as produced by the electrolytic caustic soda process. Although no attempt is made to contribute anything to the already well-known and efficient methods of electrolytically decomposing sodium chloride, it is self-evident that by virtue of the large quantities of chlorine consumed, and the nature of the products, it might be considered a valuable adjunct to the electrolytic caustic soda industry as a whole.

Although sodium chloride is mentioned specifically, it may be readily seen that this process, in conjunction with standard methods of electrolytic dissociation of alkali-metal chlorides, may be applied to potassium chloride or other similar compounds.

The chlorine may be used just as it is produced by and leaves the electrolytic cells, without any extra treatment, such as concentration, purification, condensing to liquid state, or even drying. This will eliminate extra equipment for the purification and condensation of the gaseous chlorine, in addition to the costly type of containers necessary for the transportation and storage of liquid chlorine, all of which constitutes a very considerable overhead item of expense.

The use of this process, in conjunction with established electrolytic processes for the production of caustic soda or caustic potash, as principal products, and the consequent production of chlorine and hydrogen as by-products would not only increase the total variety of products immeasurably, but make possible the manufacture of certain compounds that could not be produced otherwise.

A valuable feature of this invention, in addition to those already cited, is due to the fact that it depends on a mineral, used as a raw material, that may be obtained in unlimited quantities, is widely distributed and cheap.

Whereas the electrolytic soda process produces caustic soda and chlorinated soda compounds, liquid chlorine and chlorinated products of various other types in addition to hydrogen, this process by virtue of the large calcium, magnesium and carbon dioxide production, and the ease with which they are separated from each other, and also the comparative purity of the various products, will add a large and interchangeable variety of products, all of which find a ready market, are consumed in immense quantities, bringing good prices as such, but also have possibilities of opening up new lines of production in entirely new fields.

The process is very flexible, and the products may be changed at will. For instance: Although the process is designed primarily as a continuous outlet for the by-product chlorine produced by the electrolytic dissociation of alkali-metal chlorides, we may imagine a situation wherein the supply of the chlorine may be temporarily cut off. In such an event, the chlorine radical may be allowed to stay in the cycle of reactions, functioning as described and alternating as the water soluble compound of either calcium or magnesium, which, in turn, acts as a medium in the production of the water insoluble compounds of calcium and magnesium, and to which state they must be transformed in order that they may be completely separated and recovered and utilized, all of which will be more fully described later.

In instances of this sort, wherein the chlorine supply is temporarily cut off, and it is found advisable to continue this process, advantage is taken of the constant presence of one acid radical, i. e. chlorine ($Cl_2$), and the availability of another, i. e. carbon dioxide ($CO_2$), in addition to hydroxyl (OH). One is available as a natural constituent of the mineral used, and the other is possible through the presence of water in the cycle of reactions. If the calcium and magnesium are present in molecular proportion, and the chlorine acid radical is kept at a constant ratio, it is possible to completely precipitate the water insoluble calcium carbonate ($CaCO_3$), by the addition of carbon dioxide, and then by means of filtration and washing to free it from practically all of the magnesia, which should be present as the water soluble magnesium chloride only. It is just as possible, in turn, to remove the magnesia as the water insoluble magnesium hydroxide $Mg(OH)_2$, by not adding carbon dioxide, and converting the whole of the calcium contents to the water soluble calcium chloride, which may also be completely removed from the water insoluble magnesium hydroxide by means of filtration and washing.

Anyone versed in the art will readily see, from the weak and volatile character of the acid radicals present in the water insoluble compounds of calcium and magnesium recovered from this process, that they may be readily converted to any desired compound at will. The magnesia free calcium carbonate may be disposed of as precipitated chalk or converted to hydroxide, sulphate or any other desired compound. In like manner, the magnesium hydroxide (free from calcium) may be converted into magnesium oxide, carbonate, or any other compound.

The most successful operation of this process, however, depends on a constant supply of chlorine. This necessarily means that after functioning in the separation of the calcium and magnesium, it must also be withdrawn from the process along with the various compounds of calcium and magnesium. For instance: It may prove advantageous at times to withdraw a certain specified proportion of the chlorine radical as magnesium chloride, but the bulk should be withdrawn as calcium chloride, for which there are many uses.

In this process a very large volume of carbon dioxide is produced, due to the fact that almost 50% of the weight of the mineral used as one of the raw materials consists of carbon dioxide. A certain proportion is necessary to bring about the separation of the calcium and magnesium and the same is removed, necessarily, from the cycle of reactions as calcium or magnesium carbonates, but there is an excess, which, instead of allowing to go to waste, could be utilized for the production of solid or liquid carbon dioxide. Carbon dioxide from this source is the purest known, and especially is it suitable on account of its entire freedom from poisonous compounds to the food industry, beverages, and the production of dry ice. There may be circumstances where it might prove profitable to use a certain proportion in the manufacture of sodium carbonate, bicarbonate or sesqui-carbonate, or even so called modified sodas. If so, the necessary amount of caustic soda may be taken from the caustic soda department, and brought into reaction with the necessary amount of carbon dioxide.

This process depends upon the presence, in correct proportion, of an acid radical in combination with either magnesium or calcium or both, and which is completely soluble in water. In the presence of this water soluble salt, which is necessary for the reaction, and assuming that the mixed calcium and magnesium hydroxides contain the calcium and magnesium hydroxides in molecular proportion, and which may be adjusted as explained in the following description of the various steps in the carrying out of the process. In common with most chemical processes, this process is dependent upon chemical control by means of analyses and tests to insure proper conditions. If the conditions are right, as described above, i. e. the acid radical is present in an amount sufficient to combine with all of either one of the two bases, when this solution of mixed water soluble salts containing calcium and magnesium in exact molecular proportion is added to a slurry of mixed calcium and magnesium hydroxides, also present in molecular proportion, a complete transposition of bases and acid radicals takes place. The stronger acid radical selects and combines with strongest base, or, in other words, the chlorine radical combines with the calcium, forming calcium chloride. The result is (and the only result possible under the circumstances) the magnesium, having no stronger acid radical to combine with, becomes a hydroxide, by virtue of the water present.

From the foregoing it will be observed that, if the proper conditions prevail, calcium will constitute the water soluble portion, as calcium chloride, whereas the magnesium will invariably form a water insoluble compound with the only radical available, i. e. hydroxyl. These are the compounds that are ordinarily formed and this reaction is utilized when it is found desirable to recover the magnesium contents of the rock or allied material in a water insoluble state. When, however, it is necessary to completely separate the calcium in a water insoluble condition from the magnesia, it is necessary that an extra acid radical (that is capable of forming water insoluble compounds) should be added to the mixture. This will cause the chlorine radical to be released from its combination with the calcium, when it immediately replaces the hydroxyl group and forms the water soluble salt, magnesium chloride.

Many acid radicals form water insoluble combinations with calcium, among which may be mentioned sulphuric, phosphoric and hydrofluosilicic acid. As many of these acids are stronger than hydrochloric, a calculated amount would have to be used, otherwise the excess would decompose the magnesium chloride, forming free hydrochloric acid in the solution.

In this process, carbon dioxide is used as the acid radical capable of forming a water insoluble compound with calcium. There is little danger of its displacing hydrochloric acid from its combination with magnesium, and, although calcium carbonate prepared in this manner has a considerable value and market as precipitated chalk, this method is suggested especially as a means of separation, and any desired compound may then be prepared from the pure calcium carbonate at will. A valuable feature of this method of separation lies in the fact that, inasmuch as carbon dioxide constitutes a very large proportion of the original dolomite, there is more than enough for the purpose available and which costs nothing. It will be observed that, if this process is carried out as described, a series of water soluble and water insoluble compounds are formed. They consist of either of the bases, alternating between magnesium hydroxide and calcium chloride, and calcium carbonate and magnesium chloride, depending on whichever compound is desired at the time. Advantage is thus taken of the selective action and affinities, and complete transposition of bases and radicals, that are possible in mixtures of this sort, and brought about by the presence or absence of a disturbing agent, such as $SO_3$, $P_2O_5$, $CO_2$, etc. In this particular process the carbon dioxide generated in the first step of the process is used for obvious reasons.

It is possible to produce and recover at will any of the following: Calcium carbonate, magnesium hydroxide, calcium chloride and magnesium chloride. When water insoluble calcium compounds are formed, all of the magnesia should be in a water soluble form and vice versa, and if the process is properly controlled, the calcium compounds will be found to be relatively free of magnesia and the magnesia compounds relatively free from calcium.

Instead of using hydrochloric, nitric, acetic or any of the various other acids as the acid radical capable of forming water soluble salts with either calcium or magnesium, I use gaseous chlorine, such as is produced by the electrolysis of alkali-metal chlorides. Although this process is designed primarily as an outlet for such chlorine, I do not confine myself to that particular acid radical, as I have shown in another part of this description that other acid radicals, capable of forming water soluble salts with both the calcium and magnesium contents of dolomite or similar minerals, may be used, and used in conjunction with carbon dioxide and hydroxyl. It has also been shown that it is necessary to withdraw chlorides from the cycle of reactions, where this process is intended as an outlet for by-product chlorine. There may be times or circumstances, however, wherein it is found advisable to keep the acid radical circulating, and only the water insoluble products of the calcium and magnesia contents of the mineral are withdrawn from the cycle of reactions, and in that case the process will be found flexible enough, and entirely satisfactory.

Advantage is taken of the fact that when gaseous chlorine, even when largely diluted with air or inert gases, is brought in contact with alkali metal, alkaline-earth metal, or metallic hydroxides, or oxides suspended in water, immediately forms chlorides principally of the particular base acted upon, and a fraction is converted to hypochlorite or chlorate of the same base, depending on the temperature. In this process, the hypochlorite and chlorate are just as available for the purpose as the chloride, as they are also capable of forming highly water soluble salts with either the calcium or magnesium. If hypochlorites are formed, they are changed to chlorides or chlorates automatically during the manipulation of the solution. It is possible, under proper temperature conditions, to convert one molecule of chlorine out of six into a chlorate, or, in other words, taking calcium hydroxide as an example, it is possible to form one (1) molecule of calcium chlorate for each five (5) molecules of calcium chloride.

It is recommended that advantage be taken of this, also of the fact that, upon the addition of two (2) molecules of an alkali metal chloride to one (1) molecule of the alkaline-earth-metal chlorate or metal chlorate as formed in this process, two (2) molecules of an alkali-metal chlorate are formed, such as potassium or sodium chlorate.

Although not essential to the process, the above procedure is resorted to, as it brings about the recovery of a valuable by-product. This result is brought about by the addition of a calculated amount of either sodium chloride or potassium chloride to the strong solution of mixed chlorides and chlorates, formed by treating the slurry of mixed calcium and magnesium hydroxides (hot) with chlorine. This causes the formation of equivalent amounts of sodium or potassium chlorate. It is especially recommended that this reaction take place in the solution of mixed magnesium chloride and chlorate.

When the demand warrants it, the whole product of mixed magnesium chloride and chlorate may be disposed of in concentrated solutions, as a non-poisonous weed exterminator, instead of using it as a source of sodium or potassium chlorate. It has been demonstrated that chlorates are powerful weed-killers. This killing effect is brought about by the action of nascent oxygen, released in the presence of organic matter and moisture by the chloric acid radical.

The mixture of magnesium chloride and chlorate obtained in this process is an especially efficient weed exterminator, and it is non-poisonous, will not sterilize the soil, and is much more active than alkaline chlorates, which are used exclusively at present. This is especially true if the ratio of chloride to chlorate is reduced from 5 to 1 to 2 to 1 by any of the well known methods.

The following description of steps in the process and necessary reaction formulas are given to clarify any obscure phases of the foregoing disclosure.

The process is carried out as follows:

1st step

The dolomite is crushed to proper size for calcining.

2nd step

The above is calcined in a rotary-kiln and under proper temperature conditions, the following reaction takes place:

$$MgCO_3 + CaCO_3 + heat = MgO + CaO + 2CO_2$$

3rd step

The mixed oxides of magnesium and calcium are slaked with water, preferably in a mechanical slaker. Dilute the resultant milk so that impurities, such as silica, iron, alumina, unburned carbonate, etc., together with a certain amount of magnesium and calcium hydroxides, will settle out, when passed through a mechanical classifier.

Reaction:

$$MgO + CaO + 2H_2O = Mg(OH)_2 + Ca(OH)_2$$

The discard from classifier, containing the impurities are stored on dump to be worked up in time by special methods. The thin slurry of mixed hydroxides is thickened by well known means.

4th step

The thickened pulp of mixed hydroxides obtained in 3rd step is transferred to a suitable apparatus, where it is saturated with chlorine, preferably keeping the mixture hot enough to form chlorates, instead of hypochlorites, when the following reaction takes place:

$$3Ca(OH)_2 + 3Mg(OH)_2 + 6Cl_2 = \\ 3CaCl_2 + 2MgCl_2 + Mg(ClO_3)_2 + 6H_2O$$

5th step

The solution of mixed chlorides and chlorate of calcium and magnesium formed in 4th step is allowed to settle to separate any remaining impurities and the clear solution transferred to a mixing and adjusting tank, supplied with a stirring arrangement. To this is added the necessary amount of slurry of hydroxides formed in the 3rd step, determined by analysis. Transfer to absorbing tanks and towers, the tanks to be furnished with stirrers and all to be gas tight. Treat with carbon dioxide, which may readily be obtained from 2nd step. This operation is also chemically controlled. The following reaction takes place:

$$3CaCl_2 + 2MgCl_2 + Mg(ClO_3)_2 + \\ 3Ca(OH)_2 + 3Mg(OH)_2 + 6CO_2 = 6CaCO_3 + \\ 5MgCl_2 + Mg(ClO_3)_2 + 6H_2O$$

6th step

Filter the above and wash so as to remove all of the water soluble salts. The moist calcium carbonate filter cake may be used for the production of various calcium salts, or it may be dried and marketed as "precipitated chalk". This calcium is the first constituent to be completely removed from the cycle.

The remaining solution of mixed magnesium chloride and chlorate may be concentrated to cause the crystallization of the bulk of the magnesium chloride, which then is easily separated from the chlorate. This provides one method for the separation of the calcium and magnesium from the raw material.

Another method of treating the mixed hydroxides wherein the bases are in molecular proportion is to add an acid radical that is capable of forming a water soluble salt with both of the bases but only sufficient in amount to combine with one, when, by the force of chemical attraction, it will combine with the stronger base.

The hydroxyl group which is obtained from the water present in the reaction, and which is capable of forming water insoluble compounds with both of the bases, remains in an unchanged state in the weaker or metal salt base. The interchange of bases and radicals are shown in the following equation:

$$6Ca(OH)_2 + 6Mg(OH)_2 + 6Cl_2 = \\ 5CaCl_2 + Ca(ClO_3)_2 + 6Mg(OH)_2$$

The separation of the above water insoluble magnesium hydroxide is brought about by suitable means.

Without introducing an additional amount of the chlorine radical, the remaining solution may be caused to react by adding the original slurry of mixed hydroxides equivalent in calcium contents to the calcium contents of the solution, and then introducing the extra radical carbon dioxide in sufficient amount to completely transform and precipitate the calcium contents of the mixture as calcium carbonate as in the following equation:

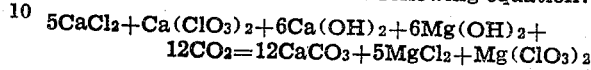
$$5CaCl_2+Ca(ClO_3)_2+6Ca(OH)_2+6Mg(OH)_2+12CO_2=12CaCO_3+5MgCl_2+Mg(ClO_3)_2$$

In the above instance the chlorine radical was shown as present in amount to combine with and form a water soluble salt with all of the calcium. Adding additional slurry containing calcium hydroxide in suspension and in amount equal to the calcium in the solution and then adding an extra radical capable of forming a water insoluble compound with the calcium, caused the precipitation and made possible the removal of all of the calcium from the cycle of reactions, and caused the chlorine radical to combine with and form a water soluble salt with the magnesia contents of the mixture.

If it is found desirable to recover the magnesia contents of the above solution, comprising a mixture of magnesium chloride and chlorate, it is necessary only to add more of the original slurry of mixed hydroxides in an amount, so that the magnesia contents of the slurry are the same as the magnesia in the chloride solution, and in the absence of carbon dioxide, the transposition of bases and radicals takes place, wherein the chlorine combines with the stronger alkaline earth base, forming a water soluble salt with it, and all of the metal base is transformed to the water insoluble hydroxide, which may be separated by well known means. The change is shown as follows:

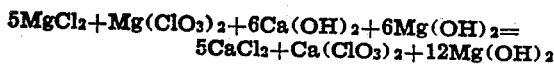
$$5MgCl_2+Mg(ClO_3)_2+6Ca(OH)_2+6Mg(OH)_2=5CaCl_2+Ca(ClO_3)_2+12Mg(OH)_2$$

From the foregoing it is shown that in the absence of a constant supply of the acid radical which in turn is removed in a combined state with one of the bases from the cycle of reactions, it is possible to keep the acid radical circulating, alternately combining with the alkaline earth base and the metal base, depending on the absence or presence in sufficient amount of the disturbing radical carbon dioxide.

By observing the prescribed conditions wherein the bases must be added to the cycle of reactions in exact molecular proportion, and the acid radical capable of forming water soluble salts with both of the bases, is present in only sufficient amount to combine with one of the bases, it is possible, without further additions of the said acid radical, and through the presence or absence of an additional radical capable of forming a water insoluble compound with one of the bases, to alternately precipitate and separate the alkaline earth base, or the metal base in a water insoluble state.

In the specific reaction described in the 5th step, carbon dioxide was used as an illustration, as it was readily obtainable from the carbonates of the original material. Another reason was: The insoluble product could readily be converted into any desired salt or compound of the base, due to the weak character of the acid radical.

If the conditions as to the molecular proportion of the bases and the amount of acid radical in the mixture is adhered to, it is possible to completely separate the alkaline earth base as a water insoluble compound from the water soluble compound by introducing other radicals than carbon dioxide and hydroxyl, such as the radicals of sulphuric, phosphoric, hydrofluosilicic acids, etc., in correct amount to completely react with all of the base that is to be precipitated. Using sulphuric acid, in correct proportion, as an example, will cause a reaction and separation according to the following reaction:

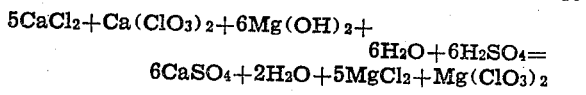
$$5CaCl_2+Ca(ClO_3)_2+6Mg(OH)_2+6H_2O+6H_2SO_4=6CaSO_4+2H_2O+5MgCl_2+Mg(ClO_3)_2$$

7th step

The filtrate from the 6th step, and consisting of a mixture of magnesium chloride and chlorate, may be disposed of and is useful as a concentrated solution for killing weeds, etc., or this filtrate may be transferred to a suitable mixing tank, and the wash water used in lieu of water where possible. To the strong solution a calculated amount of potassium chloride or sodium chloride is added. Concentrate, if necessary, and recover the alkali chlorate by any one of the many methods known. The bulk of the magnesium chloride may be removed by crystallization before the addition of the alkali chloride. If the solution is used in its original state, the following reaction with potassium chloride takes place:

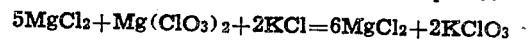
$$5MgCl_2+Mg(ClO_3)_2+2KCl=6MgCl_2+2KClO_3$$

After recovering the potassium chlorate crystals, the magnesium chloride may be removed, as such, thus completing the cycle, and providing another method for separating the calcium and magnesium from the raw material.

Calcium chloride may be produced by utilizing all or a portion of the chlorine in the magnesium chloride by resorting to the following,

8th step

The magnesium chloride and chlorate are mixed with an equivalent amount of mixed hydroxides from 3rd step, according to the following reaction:

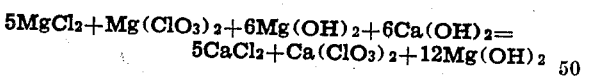
$$5MgCl_2+Mg(ClO_3)_2+6Mg(OH)_2+6Ca(OH)_2=5CaCl_2+Ca(ClO_3)_2+12Mg(OH)_2$$

Separation is made by filtration and washing. The magnesium hydroxide may be converted into either carbonate or oxide, the first by using some of the excess carbon dioxide, and the second by drying and calcining. The calcium chloride is disposed of as such.

It is evident from this description that only a few steps are necessary in converting the constituents of dolomite into a series of relatively pure compounds of magnesium and calcium by the use of chlorine, bringing about the complete separation of large quantities of magnesium oxide, calcium oxide and carbon dioxide. The chlorine produced as a by-product in the manufacture of caustic soda and hydrogen by electrolysis may be used to produce, as by-products: potassium or sodium chlorate, weed killer (non-poisonous), magnesium oxide, magnesium chloride, magnesium carbonate, and calcium chloride and carbonate, all of which are useful commercially in large quantities.

If the discard from classifier accumulates too rapidly, it may be worked up for its calcium and magnesium contents by treating with chlorine, the same as in the 4th step, but in a smaller and separate apparatus. This discard will contain the bulk of the impurities found in the dolomite. If any iron or alumina should go into solution, they are easily precipitated along with the silica by addition of an excess of the mixed hydroxides.

This process, due to its flexibility, is capable of use for purposes which are not emphasized especially in this description, as this process is designed especially as an outlet for large quantities of by-product chlorine and as means of breaking up a relatively low-grade mineral into high-grade calcium and magnesium products that are practically free from each other as contaminants.

In case the supply of chlorine is cut off for any purpose, or it is found advantageous to dispose of it in another manner, such as an increased demand for liquid chlorine, or new outlets found for it in increased demand for chlorinated organic compounds, it would not interfere with the successful operation of this process.

Even if it did not act as an outlet for excess chlorine the process could still be used for converting a low-grade mineral into high-grade and pure products, relatively free from each other as contaminants or impurities.

In the foregoing descriptive matter, emphasis is placed on the fact that this process constitutes an outlet for chlorine gas, as such, and especially by-product chlorine. Although the electrolysis of sodium chloride is mentioned specifically as one source of the chlorine, it is obvious that by-product chlorine from any source or chemical process may be used just as satisfactorily.

An important feature, which enhances the value of this process, and which is quite obvious to those skilled in the art of chemical manipulations, and from the description of the process is:

It is possible, under certain circumstances, to first use the chlorine as such, in various chemical operations, such as chlorinating organic or inorganic compounds, or for oxidation purposes, etc., and wherein large quantities of by-product hydrochloric acid are produced, either as a gas or a water solution of the gas, and this hydrochloric acid may be utilized instead of chlorine, although in some instances it may be desirable to first scrub out certain odors or colors or even solid material that had been entrained in the gas.

As mentioned in an early part of the description of this process, the chlorine radical may be introduced as a water soluble chloride of either calcium or magnesium or a mixture of both. It may be obtained as a by-product from a chemical or a hydrometallurgical operation, or it may be of a natural derivation, as brines or bitterns, encountered in the recovery of sodium or potassium chloride.

In order that the calcium and magnesium products of the process may be obtained relatively free from each other as contaminants, and to make sure the most successful conditions for the operation of the process, it is necessary, as previously specified, that the two bases must be present in the mixture and cycle of successive reactions in molecular proportion to insure the complete transposition of bases and acid radicals.

Almost invariably dolomite and kindred minerals will fall short of having the bases in exact molecular proportion, and adjustments must be made by means of chemical control methods, and additive substances, either in solution or solid.

I find the best method of making this adjustment to be as follows:

A portion of the dolomite that has been previously calcined and slaked is treated separately with chlorine or hydrochloric acid in such an amount that only the calcium is dissolved as calcium chloride and chlorate in some instances, or as the chloride only in other instances, and the magnesium is left in a water insoluble form as magnesium hydroxide. The water soluble calcium salts are utilized as described, and the magnesium hydroxide is used for adjusting the ratio of magnesium to calcium. This is accomplished by assaying the thickened pulp of mixed hydroxides obtained in Step 3 and adding the required amount of magnesium hydroxide obtained as just described, and before the addition of chlorine. The various steps of the process are then proceeded with from this stage.

The advantages of the foregoing described method of procedure, constituting the preferred manner of carrying out the process, are apparent. High-grade manufactured products are obtained from low-grade minerals or like material. Clean separation may be accomplished. The impurities of the original raw material are readily and easily eliminated. The natural constituents of the mineral material are utilized, in addition to the water that is taken up in the process for effecting the necessary separations. The acid radical, in the presence of which these reactions occur, constitutes in most instances the utilization of a waste or by-product. This chlorine radical is automatically recoverable, if found advisable, in such shape as to be available for subsequent use in decomposing fresh lots of the mineral material. The process is easily controlled, and may be not only applied to a variety of calcium and magnesia bearing materials, but may also indirectly enhance the value or cheapen the operation of other and distinctly different processes.

Although, in the example cited, carbon dioxide is already one of the constituents of the raw material containing sufficient calcium and magnesium, there may be instances, wherein the carbon dioxide may be insufficient in quantity although the calcium and magnesium may be present in the correct amount and ratio, such as might be obtained in working up certain types of calcium and magnesium bearing industrial wastes. In such instances, the necessary carbon dioxide may be obtained from burning fuel, or a by-product, from fermentation or other sources. It will be noted also that any inequalities in the ratio of magnesia to calcium in the raw material may be readily and easily rectified.

What I claim is:—

1. The process of treating a mixture of calcium hydroxide and magnesium hydroxide, kept in equi-molecular proportion, comprising the introduction of free chlorine, adding an equivalent amount containing the same respective weights of the mixed hydroxides as in the said mixture and introducing another radical which will form a water insoluble compound with one of the bases, and crystallizing out the salt of the other base.

2. The process of treating a mixture of calcium hydroxide and magnesium hydroxide, kept in equi-molecular proportion, comprising the introduction of free chlorine, adding an equivalent amount containing the same respective weights of the mixed hydroxides as in the said mixture and introducing another radical which will form a water insoluble compound with only one of the bases, and crystallizing out the salt of the other base.

3. The process of treating a mixture of calcium hydroxide and magnesium hydroxide, kept in equi-molecular proportion, comprising the introduction of free chlorine in its elemental state, adding an equivalent amount containing the same respective weights of the mixed hydroxides as in the said mixture and introducing another radical which will form a water insoluble compound with one of the bases, removing the insoluble compound thus formed, introducing an alkali salt of the same acid radical in molecular proportion into the remaining soluble salts, and separating out the less soluble alkali salt.

4. The process of treating a mixture of calcium and magnesium hydroxides, kept in equi-molecular proportion, comprising the introduction of free chlorine in its elemental state, adding an equivalent amount containing the same respective weights of the mixed hydroxides as in the said mixture and introducing another radical which will form a water insoluble compound with one of the bases, removing the insoluble compound thus formed, introducing potassium chloride in equi-molecular proportion into the remaining soluble salts, and separating out the less soluble akali salt.

5. The process of treating a mixture of calcium hydroxide and magnesium hydroxide, kept in equi-molecular proportion, comprising the introduction of elemental chlorine to form a water soluble salt with one of the bases of said hydroxides, adding an equivalent amount containing the same respective weights of the mixed hydroxides as in the said mixture, introducing carbon dioxide to form a water insoluble compound with the calcium, and crystallizing out the salt of magnesium.

6. The process of treating a mixture of calcium hydroxide and magnesium hydroxide, kept in equi-molecular proportion, comprising the introduction of elemental chlorine to form a water soluble salt with both of the bases of said hydroxides, adding an equivalent amount containing the same respective weights of the mixed hydroxides as in the said mixture, introducing carbon dioxide to form a water insoluble compound with the calcium, and crystallizing out the salt of magnesium.

ELMER E. DOUGHERTY.